United States Patent [19]

Kato

[11] Patent Number: 4,754,294

[45] Date of Patent: Jun. 28, 1988

[54] ELECTROPHOTOGRAPHIC PRINTER

[75] Inventor: Keishi Kato, Kanagawa, Japan

[73] Assignee: Fuji Photo Film Co., Ltd., Kanagawa, Japan

[21] Appl. No.: 115,733

[22] Filed: Nov. 2, 1987

[30] Foreign Application Priority Data

Oct. 31, 1986 [JP] Japan ............................. 61-259830

[51] Int. Cl.$^4$ ............................................ G01D 15/00

[52] U.S. Cl. ..................................... 346/160; 346/105

[58] Field of Search ................... 346/160, 107 R, 108, 346/105, 76 PH, 76 R, 160.1; 355/10, 3 R; 400/119, 120; 101/DIG. 13, 467, 470, 463.1; 358/300

[56] References Cited

U.S. PATENT DOCUMENTS 4,588,990 5/1986 Tamara ............................. 346/160
4,673,956 6/1987 Kobayashi ......................... 346/160

*Primary Examiner*—Arthur G. Evans
*Attorney, Agent, or Firm*—Sughrue, Mion, Zinn, Macpeak, and Seas

[57] ABSTRACT

An electrophotographic printer comprises a charger for uniformly charging a photoconductor, a unit for irradiating a light beam modulated based on image signals representing a continuous tone image onto the uniformly charged photoconductor, thereby to form an electrostatic latent image on the photoconductor, and a wet developing unit for developing the electrostatic latent image into a toner image by use of a liquid toner. An adhesive transfer unit is provided for heating a transfer sheet provided with a thermally-sensitive adhesive layer, which softens at a softening temperature lower than the melting temperature of the toner contained in the liquid toner, at a temperature which is not lower than the softening temperature of the adhesives and is lower than the melting temperature of the toner, and pushing the transfer sheet against the photoconductor to transfer the toner image to the softened adhesive layer. A sheet adhesion unit is provided for heating the transfer sheet, to which the toner image has been transferred, to a temperature equal to or above the melting temperature of the toner, and adhering a different sheet material to the adhesive layer of the transfer sheet.

4 Claims, 4 Drawing Sheets

ELECTROPHOTOGRAPHIC PRINTER

BACKGROUND OF THE INVENTION

1. Field of the Invention

This invention relates to a printer for recording images by an electrophotographic process. This invention particularly relates to an electrophotographic printer for recording high-gradation, continuous tone images.

2. Description of the Prior Art

There have heretofore been known electrophotographic printers for forming an electrostatic latent image by exposing a uniformly charged photoconductor to a light beam modulated based on image signals representing a continuous tone image, and then forming a hard copy of the image by the ordinary electrophotographic process.

On the other hand, various electrophotographic processes for recording a continuous tone image with good gradation reproducibility have heretofore been proposed. For example, in Japanese Patent Publication No. 49(1974)-38172, it has been proposed to employ an electrophotographic process wherein an electrostatic latent image formed on a photoconductor is developed into a toner image by use of a liquid toner, an adhesive tape is then closely contacted with the toner image under pressure to peel off and pick up the toner image onto the adhesive tape, and thereafter the adhesive tape is adhered to a final substrate.

The liquid toner used in the proposed electrophotographic process comprises an insulating liquid and minute charged toner particles dispersed therein. The toner particle sizes are normally within the range of 0.1 μm to 1.0 μm, and thus are smaller than these of the dry toner particles which are used in a dry developing process. Therefore, the proposed electrophotographic process is advantageous for the recording of a continuous tone image.

As to the method of transferring the toner image formed on the photoconductor onto a substrate such as paper, the method wherein the toner image is electrostatically transferred by use of "corotoron charger" has been used widely. However, this transfer method has the drawback that the transfer efficiency is low both at high density regions and at low density regions. On the other hand, with the adhesive transfer method wherein the toner image is transferred to the adhesive layer in the manner mentioned above, a very high transfer efficiency can be obtained regardless of the image density. Also from this viewpoint, the proposed electrophotographic process mentioned above is advantageous for the recording of a continuous tone image.

In cases where the adhesive transfer is carried out as mentioned above, a sheet provided with an adhesive layer which is adhesive at room temperature or a sheet provided with a thermally-sensitive adhesive layer which is not adhesive at room temperature and becomes adhesive upon being heated is used as the transfer sheet. The former transfer sheet is processed in a form in which it is provided with release agent coated paper. Therefore, in the case where the former transfer sheet is used, a means for removing the release agent coated paper from the transfer sheet prior to the adhesive transfer step, a means for winding up the release paper removed from the transfer paper or the like is necessary. On the other hand, the latter transfer sheet requires no such means, and therefore is advantageous from the viewpoint of making the printer smaller and lighter.

However, it has been usually often recognized that, even though the wet developing process and the adhesive transfer process as mentioned above are employed, gradation reproducibility deteriorates when the adhesive transfer is carried out with usual adhesive tape to record a high-gradation, continuous tone image.

SUMMARY OF THE INVENTION

The primary object of the present invention is to provide an electrophotographic printer which records a high-gradation, continuous tone image with good gradation reproducibility by use of a transfer sheet provided with a thermally-sensitive adhesive layer.

Another object of the present invention is to provide an electrophotographic printer which provides printed images having good storage stability.

The present invention has been made based on the findings that, in the course of adhesive transfer carried out by use of a transfer sheet provided with a thermally-sensitive adhesive layer, a toner on a photoconductor melts with heat applied for softening the adhesive layer and clings to the photoconductor, so that the toner transfer efficiency is lowered.

Specifically, the present invention provides an electrophotographic printer comprising:

(i) a photoconductor, (ii) a charger for electrostatically charging said photoconductor uniformly, (iii) a light beam irradiating means for irradiating a light beam modulated based on image signals representing a continuous tone image onto said uniformly charged photoconductor, thereby to form an electrostatic latent image on said photoconductor, (iv) a wet developing unit for developing said electrostatic latent image into a toner image by use of liquid toner, (v) an adhesive transfer means for heating a transfer sheet provided with a thermally-sensitive adhesive layer, which softens and becomes adhesive at a softening temperature lower than the melting temperature of the toner contained in said liquid toner, at a temperature which is not lower than said softening temperature of the adhesives and, at the same time, is lower than said melting temperature of said toner, and pushing said transfer sheet against said photoconductor while said transfer sheet is being thus heated, thereby to transfer said toner image to the softened adhesive layer, and (vi) a sheet adhesion means for heating said transfer sheet, to which said toner image has been transferred, to a temperature equal to or above said melting temperature of said toner, and adhering a different sheet material to said adhesive layer of said transfer sheet while said transfer sheet is being thus heated.

In the electrophotographic printer in accordance with the present invention, the transfer sheet provided with a thermally-sensitive adhesive layer softening at a temperature lower than the melting temperature of the toner is used.

When the transfer sheet is heated at the temperature defined above at the adhesive transfer means, the thermally-sensitive adhesive layer of the transfer sheet softens, but the toner does not melt. Therefore, it is possible to prevent the toner from melting and clinging to the photoconductor, and to achieve a toner transfer efficiency of nearly 100%.

On the other hand, when the transfer sheet is heated at the temperature as defined above at the sheet adhesion means, the toner is molten and is securely fixed to the transfer sheet or a different sheet material adhered to the transfer sheet.

With the electrophotographic printer in accordance with the present invention, the wet developing process and the adhesive transfer process are employed, and melting and clinging of the toner to the photoconductor can be prevented in the course of adhesive transfer of the toner image. Therefore, the toner image can be transferred to the transfer sheet at a transfer efficiency of nearly 100%, and a continuous tone image can be recorded with very good gradation reproducibility.

Also, with the electrophotographic printer in accordance with the present invention wherein the toner is heated and molten at the time a different sheet material is adhered to the transfer sheet to which the toner image has been transferred, the toner fixing effects are enhanced and a printed image having good storage stability can be obtained.

DESCRIPTION OF THE PREFERRED EMBODIMENTS

The present invention will hereinbelow be described in further detail with reference to the accompanying drawings.

Figure 1:
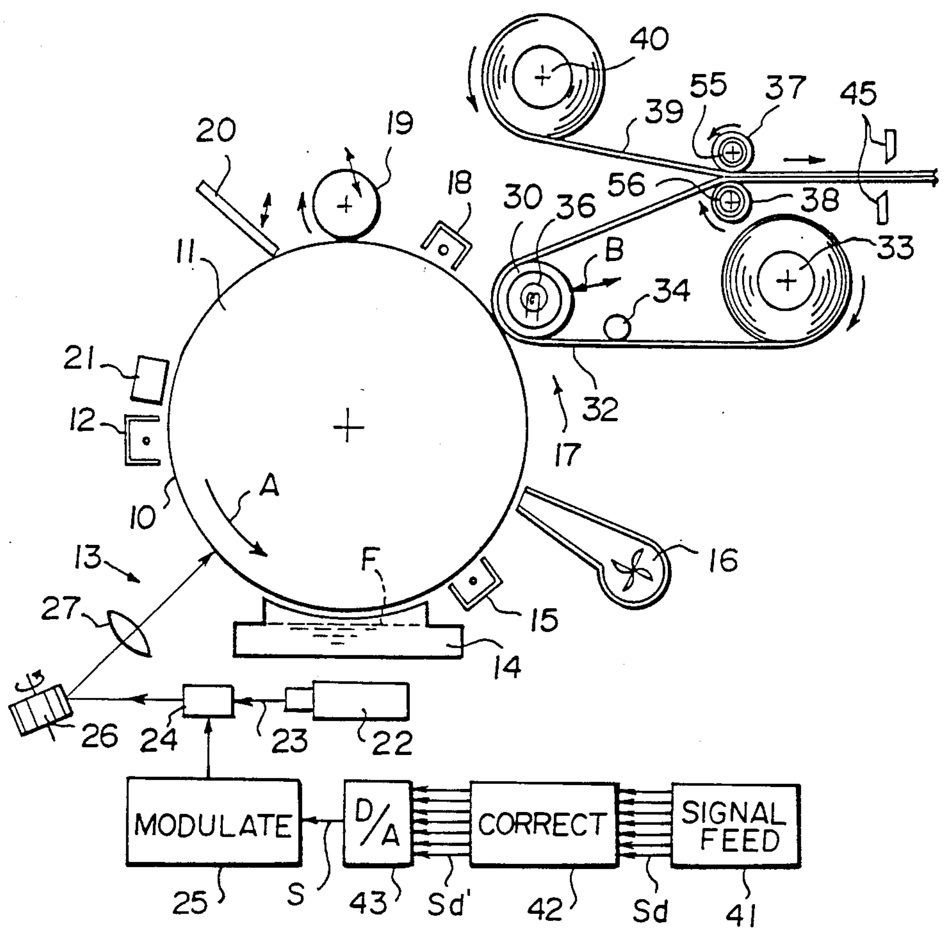
FIG. 1 is a schematic view showing an embodiment of the electrophotographic printer in accordance with the present invention.

With reference to FIG. 1, a photosensitive material drum 11 provided with a photoconductor 10 disposed along the circumferential surface is rotated by a drive means (not shown) in the direction as indicated by the arrow A. A charger 12, an exposure unit 13, a wet developing unit 14, a drum drying corona discharger 15, a drum drying fan 16, an adhesive transfer means 17, a discharger 18, a cleaning roller 19, a cleaning blade 20, and an erasing lamp 21 are disposed around the photosensitive material drum 11 in the rotating direction thereof.

The exposure unit 13 is provided with a laser beam source 22 constituted by a semiconductor laser, a He-Ne laser or the like, a light modulator 24 constituted by an acousto-optic light modulator (AOM), or the like, for intensity modulation of a laser beam 23 emitted by the laser beam source 22, a modulation circuit 25 for operating the light modulator 24, a light deflector 26 constituted by a polygon mirror, or the like, for reflecting and deflecting the modulated laser beam 23 so that the laser beam 23 scans on the photoconductor 10 approximately normal to the rotating direction A of the photosensitive material drum 11, and a scanning lens 27 constituted by an $f\theta$ lens, or the like, for converging the laser beam 23 into a uniform beam diameter on the photoconductor 10.

On the other hand, the adhesive transfer means 17 comprises a hollow push roller 30 moveable by a known means in the direction as indicated by the arrow B between a position at which the push roller 30 is closely contacted under pressure with the photoconductor 10 on the circumferential surface of the photosensitive material drum 11 and a position at which the push roller 30 is spaced away from the photoconductor 10, an adhesive sheet feed roller 33 around which a transparent adhesive sheet 32 as a transfer sheet is wound and stored, and a heating lamp 36 disposed in the push roller 30. The transparent adhesive sheet 32 is provided with a thermally-sensitive adhesive layer, as will be described later, on one surface. The transparent adhesive sheet 32 is applied around the push roller 30 with the thermally-sensitive adhesive layer facing out, and is passed between pressure adherence rollers 37 and 38 constituting a pair of nip rollers. The pressure adherence rollers 37 and 38 are provided therein with, for example, electric heating members 55 and 56, and can be heated to a predetermined temperature. The pressure adherence rollers 37 and 38 are rotated by a drive means (not shown) in the directions as indicated by the arrows. The pressure adherence rollers 37 and 38 constitute a sheet adherence means together with a sheet feed roller 40 around which a paper sheet 39 as an opaque substrate is wound and stored. The paper sheet 39 fed from the sheet feed roller 40 is laid upon the transparent adhesive sheet 32 and passed between the pressure adherence rollers 37 and 38. As the paper sheet 39, a white paper sheet may be used.

When image recording is to be carried out, the photosensitive material drum 11 is rotated in the manner mentioned above. Also, the heating lamp 36 in the push roller 30 is turned on, and the temperature of the surface of the push roller 30 is thereby maintained at a value which is not lower than the softening temperature of the thermally-sensitive adhesive layer of the transparent adhesive sheet 32 (i.e. the temperature at which the thermally-sensitive adhesive layer softens and becomes adhesive) and, at the same time, is lower than the melting temperature of the toner contained in a liquid toner F. Digital image signals Sd representing a continuous tone image are fed from an image signal feeder 41 to a D/A converter 43 via a correction table 42, and analog signals S generated by the D/A converter 43 are fed to the modulation circuit 25. The image signals Sd are converted to image signals Sd' by the correction table 42, as will be described later. The modulation circuit 25 operates the light modulator 24 based on the image signals S, and thus the laser beam 23 is intensity modulated in accordance with the image signals S.

As the photosensitive material drum 11 is rotated in the manner mentioned above, the photoconductor 10 is moved with respect to the charger 12 and is electrostatically given a uniform charge by the charger 12. The uniformly charged photoconductor 10 is then exposed to the laser beam 23 deflected by the light deflector 26 in the manner mentioned above. The laser beam 23 is caused by the aforesaid deflection to scan the photoconductor 10 one-dimensionally in the main scanning direction, and is caused by the rotation of the photosensitive material drum 11 to scan the photoconductor 10 in a sub-scanning direction. As a result, the photoconductor 10 is scanned two-dimensionally by the laser beam 23. As mentioned above, the laser beam 23 has been modulated based on the image signals S. Therefore, an electrostatic latent image of the image which the image signals S represent is formed on the photoconductor 10 exposed to the laser beam 23.

The electrostatic latent image is developed by the wet developing unit 14 into a toner image. The wet developing unit 14 develops the electrostatic latent image into the toner image by contacting the liquid toner F, which comprises an insulating liquid and minute charged toner particles dispersed therein, with the photoconductor 10, and causing the toner particles to cling to the photoconductor 10 by electrostatic attraction. The density of the toner image thus formed varies in accordance with the intensity modulation of the laser beam 23, and the gradation of the continuous tone image which the image signals Sd represent is reproduced. After the development is finished, the photosensitive material drum 11 is dried by the drum drying corona discharger 15 and the drum drying fan 16.

Figure 2:
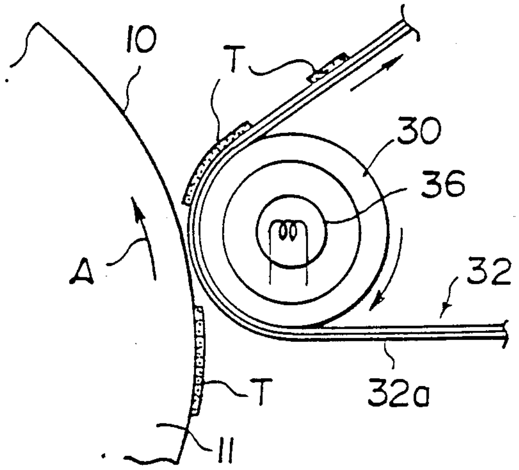
FIG. 2 is an enlarged side view showing a part of the embodiment shown in FIG. 1.
Figure 3:
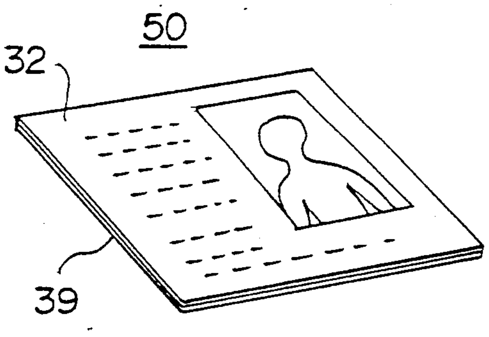
FIG. 3 is a perspective view showing a print obtained with the electrophotographic printer in accordance with the present invention.

At the time that arrival of the toner-developed portion of the photoconductor 10 at a point exactly prior to the position facing the push roller 30 is detected or recognized by a known means, the push roller 30 which has been spaced away from the photosensitive material drum 11 is moved to push the photosensitive material drum 11 and, at the same time, the pressure adherence rollers 37 and 38 are activated. As the push roller 30 is moved in this manner, the thermally-sensitive adhesive layer side of the transparent adhesive sheet 32 is pushed against the photoconductor 10. The push roller 30 follows up the photosensitive material drum 11 and is rotated thereby, and the pressure adherence rollers 37 and 38 are rotated. Therefore, the transparent adhesive sheet 32 is moved in close contact with the photoconductor 10 at a speed equal to the speed of the photoconductor 10. At this time, the transparent adhesive sheet 32 is heated by the push roller 30 whose temperature is adjusted to the value as defined above, and the thermally-sensitive adhesive layer of the transparent adhesive sheet 32 is softened. Accordingly, as shown in detail in FIG. 2, the toner T is taken up from the photoconductor 10 onto the thermally-sensitive adhesive layer **32*a*. The transparent adhesive sheet 32 to which the toner image has been transferred by adhesion from the photoconductor 10 is fed between the pressure adherence rollers 37 and 38 which are being heated, and the paper sheet 39 is adhered to the transparent adhesive sheet 32. The transparent adhesive sheet 32 and the paper sheet 39 adhered to each other are then cut by a cutter 45 in a unit of the image formation region. As a result, as shown in FIG. 3, a print 50 comprising the transparent adhesive sheet 32, the paper sheet 39, and the continuous tone image recorded with the toner T therebetween is obtained. In cases where a transparent film sheet is used instead of the paper sheet 39 in FIG. 1**, a transparent print can be obtained.

After the adhesive transfer of the toner image is finished, the photoconductor 10 is discharged by the discharger 18, cleaned by the cleaning roller 19 and the cleaning blade 20, and optically discharged by the erasing lamp 21, so that the photoconductor 10 can be utilized for the next image recording.

For the aforesaid reasons, the wet development process using the wet developing unit 14 and the adhesive transfer using the adhesive transfer means 17 are advantageous for the recording of a continuous tone image. Also, in the aforesaid embodiment of the electrophotographic printer in accordance with the present invention wherein the temperature of the push roller 30 for softening the thermally-sensitive adhesive layer **32*a* is adjusted to a value lower than the melting temperature of the toner T, it is possible to prevent the toner T from melting and clinging to the photoconductor 10** in the course of the adhesive transfer of the toner image. Therefore, with this embodiment, the toner transfer efficiency can be increased to nearly 100%, and a continuous tone image having very good gradation reproducibility can be recorded.

On the other hand, the temperature of the pressure adherence rollers 37 and 38 are adjusted to a value equal to or above the melting temperature of the toner T. Therefore, at the time the transparent adhesive sheet 32 and the paper sheet 39 are adhered to each other by the pressure adherence rollers 37 and 38, the toner T on the thermally-sensitive adhesive layer **32*a* melts and is substantially fixed to the paper sheet 39**.

In order to obtain the temperature relationships as mentioned above, a toner containing an acrylic copolymer (having a melting temperature of 120° C. as disclosed in Japanese Unexamined Patent Publication No. 61(1986)-50951 for example) or the like may be used as the toner T, and an acrylic thermoplastic polymer (having a softening temperature of 70° C., a laminate film comprising PET and said polymer applied thereon being supplied by Fuji Tokushu-shi K.K.) or the like may be used as the thermally-sensitive adhesive layer **32*a*. Also, the temperature of the push roller 30 may be adjusted to 100° C., and the temperatures of the pressure adherence rollers 37 and 38** may be adjusted to 130° C.

Figure 4:
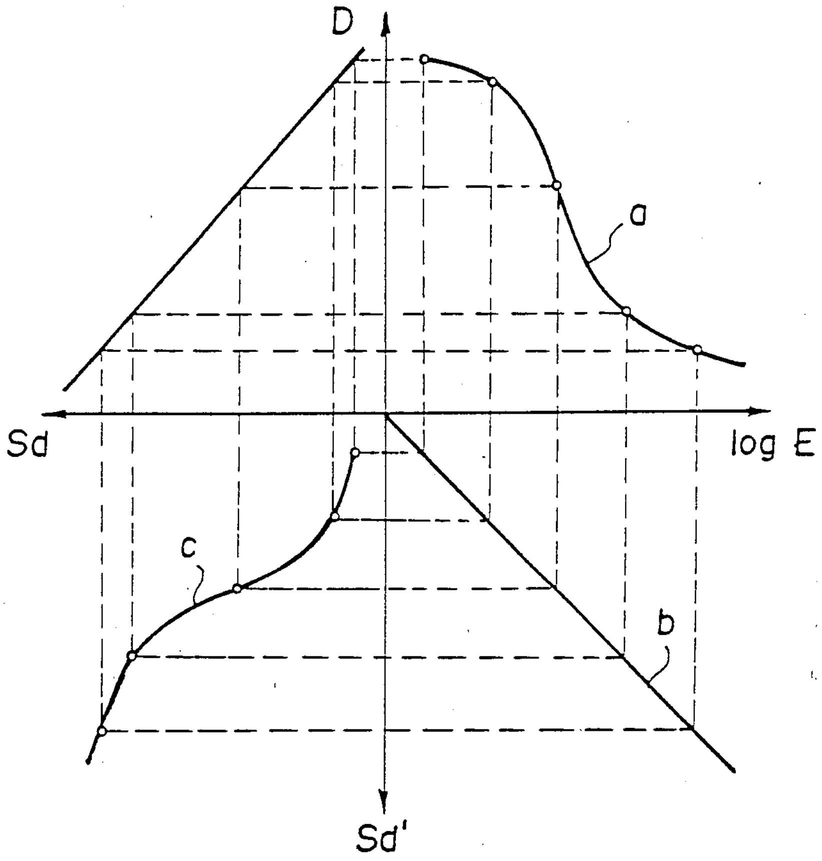
FIG. 4 is an explanatory graph showing correction characteristics of the signal correction means in the embodiment shown in FIG. 1.

With the aforesaid embodiment wherein the image signals Sd are corrected by the correction table 42, particularly excellent gradation reproducibility can be obtained. The correction will now be described below. In general, as shown in FIG. 4, gradation characteristics of the photoconductor 10, i.e. the relationships between the exposure amount E and the toner image density D are extremely nonlinear as indicated by the curve "a" in the first quadrant. On the other hand, it is possible to adjust the relationships between the image signals Sd' prior to D/A conversion and the exposure amount E to the characteristics as indicated by the straight line "b" in the fourth quadrant in FIG. 4 by the adjustment of the conversion characteristics of the D/A converter 43 and the modulation characteristics of the modulation circuit 25 and the light modulator 24. The correction table 42 is formed to convert the image signals Sd to the image signals Sd' by the characteristics indicated by the curve "c" in the third quadrant in FIG. 4. When the conversion is carried out in this manner, the relationships between the image signals Sd and the toner image density D become linear as shown in the second quadrant in FIG. 4. Therefore, the toner image density can be controlled at equal density intervals with respect to predetermined amounts of changes in the level of the image signals Sd, and the continuous tone image can be recorded with good gradation reproducibility.

Figure 5:
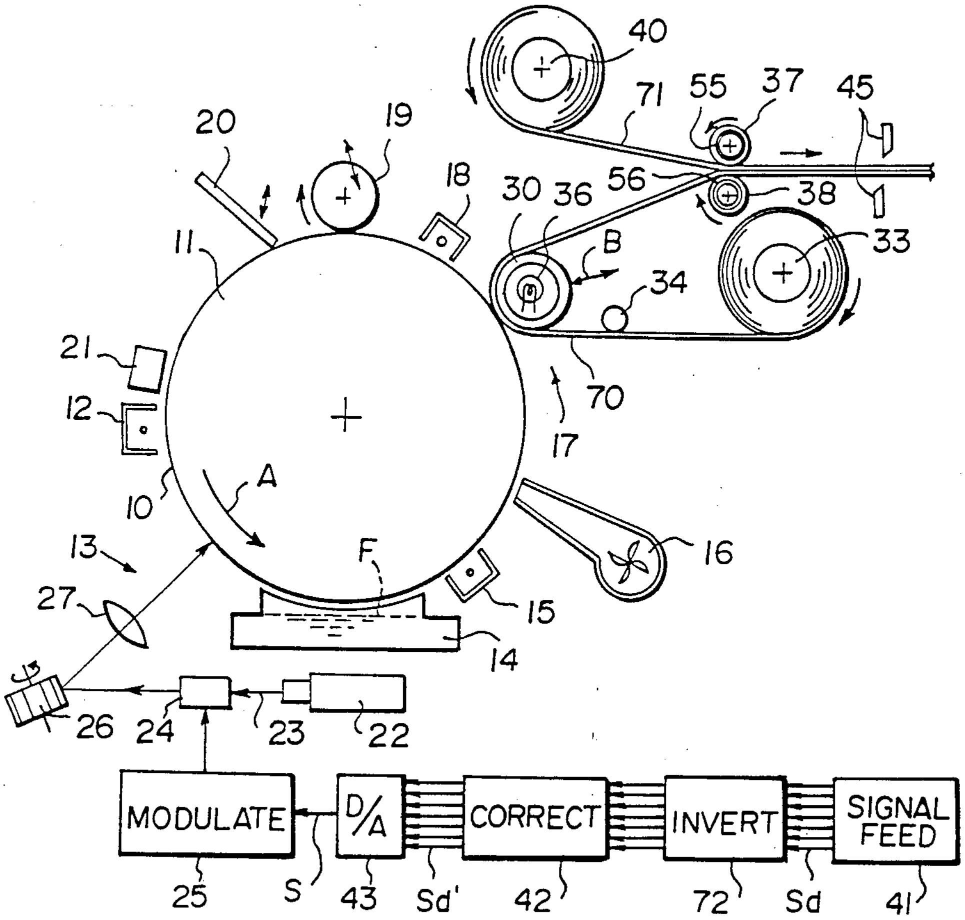
FIG. 5 is a schematic view showing another embodiment of the electrophotographic printer in accordance with the present invention.

In the aforesaid embodiment, the toner image on the photoconductor 10 is transferred by adhesion onto the transparent adhesive sheet 32. However, as in another embodiment shown in FIG. 5, the toner image may also be transferred by adhesion onto an opaque adhesive sheet 70. Specifically, in this embodiment, the opaque adhesive sheet 70 comprising, for example, a white paper sheet and a thermally-sensitive adhesive layer overlaid on the surface of the white paper sheet is used instead of the aforesaid transparent adhesive sheet 32. Also, a transparent sheet 71 as a cover sheet is stored around the sheet feed roller 40, and is adhered to the opaque adhesive sheet 70 to which the toner image has been transferred. Also in this case, a print which is apparently equivalent to the print 50 as shown in FIG. 3 can be obtained. In FIG. 5, similar elements are numbered with the same reference numerals with respect to FIG. 1.

In the aforesaid case, the toner image formed on the photoconductor 10 is transferred in the inverted form onto the opaque adhesive sheet 70. Therefore, as shown in FIG. 5, a signal inverter 72 is provided at the stage before or after the correction table 42 for example, so that a desired image is formed in the inverted form on the photoconductor 10.

In the aforesaid embodiments, the correction table 42 for correcting the image signals Sd is provided. However, the electrophotographic printer in accordance with the present invention need not necessarily be provided with such a correction means. Nevertheless a correction means should preferably be provided for further improving the gradation reproducibility of the recorded image for the reasons mentioned above.

I claim:

1. An electrophotographic printer comprising:

(i) a photoconductor, (ii) a charger for electrostatically charging said photoconductor uniformly, (iii) a light beam irradiating means for irradiating a light beam modulated based on image signals representing a continuous tone image onto said uniformly charged photoconductor, thereby to form an electrostatic latent image on said photoconductor, (iv) a wet developing unit for developing said electrostatic latent image into a toner image by use of liquid toner, (v) an adhesive transfer means for heating a transfer sheet provided with a thermally-sensitive adhesive layer, which softens and becomes adhesive at a softening temperature lower than the melting temperature of the toner contained in said liquid toner, at a temperature which is not lower than said softening temperature of the adhesives and, at the same time, is lower than said melting temperature of said toner, and pushing said transfer sheet against said photoconductor while said transfer sheet is being thus heated, thereby to transfer said toner image to the softened adhesive layer, and (vi) a sheet adhesion means for heating said transfer sheet, to which said toner image has been transferred, to a temperature equal to or above said melting temperature of said toner, and adhering a different sheet material to said adhesive layer of said transfer sheet while said transfer sheet is being thus heated.

2. An electrophotographic printer as defined in claim 1 wherein a sheet comprising a transparent member is used as said transfer sheet, and an opaque sheet material is used as said different sheet material.

3. An electrophotographic printer as defined in claim 1 wherein a sheet comprising an opaque member is used as said transfer sheet, and a transparent sheet material is used as said different sheet material.

4. An electrophotographic printer as defined in claim 1 wherein a sheet comprising a transparent member is used as said transfer sheet, and a transparent sheet material is used as said different sheet material.

* * * * *